INVENTOR.
GEORGE B. QUATMAN
BY [illegible]
ATTY.

May 20, 1958 G. B. QUATMAN 2,835,738

PAYSTATION LINE EQUIPMENT

Filed Feb. 16, 1955 2 Sheets-Sheet 2

INVENTOR.
GEORGE B. QUATMAN
BY Wm. Walter Owen
ATTY.

2,835,738

PAYSTATION LINE EQUIPMENT

George B. Quatman, Lima, Ohio, assignor to General Telephone Laboratories, Incorporated, a corporation of Delaware Application February 16, 1955, Serial No. 488,635

15 Claims. (Cl. 179—6.3)

This invention relates in general to automatic telephone systems and more particularly to improved paystation circuits in such systems.

Paystation circuits normally consist of a substation, including the usual telephone station features plus a coin mechanism, a line circuit including line and cut off relays, a switch train which may include connector, selector and linefinder switches, and a repeater which is required in conjunction with a calling paystation to control the paystation and repeat the dialled pulses through the switch train to insure connection to the called line.

Various means are employed for performing the essential functions of paystation service, which functions include preventing completion of a connection from a calling paystation until the proper coins have been deposited, collecting and refunding coins, repeating dial impulses, and various metering and alarm facilities. These functions are performed at various points in the switch train in present paystation practice, and it is therefore necessary to provide switch trains containing equipment especially adapted to perform these functions wherever paystations are placed in service. Such switch trains can be utilized only for paystation service and not for regular subscriber service, thus often preventing maximum utilization of equipment. One advantage of such confinement is that it permits assignment of paystations to a particular exchange number series, thereby providing a ready means for identification of a paystation by an operator, in that exchange, on calls from a paystation and on collect calls to a paystation.

The growth of paystation usage and the advent of nationwide toll dialling make the confinement of paystations to particular circuit paths more difficult. The problem is rendered more acute by the necessity in operator toll dialling for identifying paystations by means other than the assigned numbers, since operators in one locality, dialling directly to stations in distant localities, would not recognize called paystations by their directory numbers.

It is the object of this invention to provide all of the necessary automatic paystation service functions in line equipment individual to each paystation line, including a paystation identification signal, thus permitting the assignment of paystations to any exchange terminal and achieving economy in allowing paystations to function over the same switch trains utilized by regular subscriber stations.

A feature of this invention is the provision through paystation line equipment of a distinctive paystation signal over the talking circuit, to toll operators on calls from the paystation, and to all parties calling the paystation.

Another feature of this invention is the transmission of the paystation signal when the talking circuit has been completed, and the automatic removal of the signal after a short interval of time.

Still another feature of this invention is the provision of means in the paystation line equipment for refunding coins deposited in the paystation to the calling party on calls to a specially designated local number such as Information and those calls transferred to Intercept.

A further feature of this invention is the provision of means in the paystation line equipment for signalling an operator on calls from a paystation and simultaneously returning any coins deposited in the paystation to the calling party.

Yet another feature of this invention is the provision of means in the paystation line equipment for allowing a paystation subscriber to call a toll operator without depositing a coin, for transmitting an identifying signal to the operator, and for preventing any other calls to be made without deposit of a coin.

The foregoing and other features of the present invention, and the invention itself, will be understood from the following description thereof, together with the accompanying drawings, in which.

Figure 1:
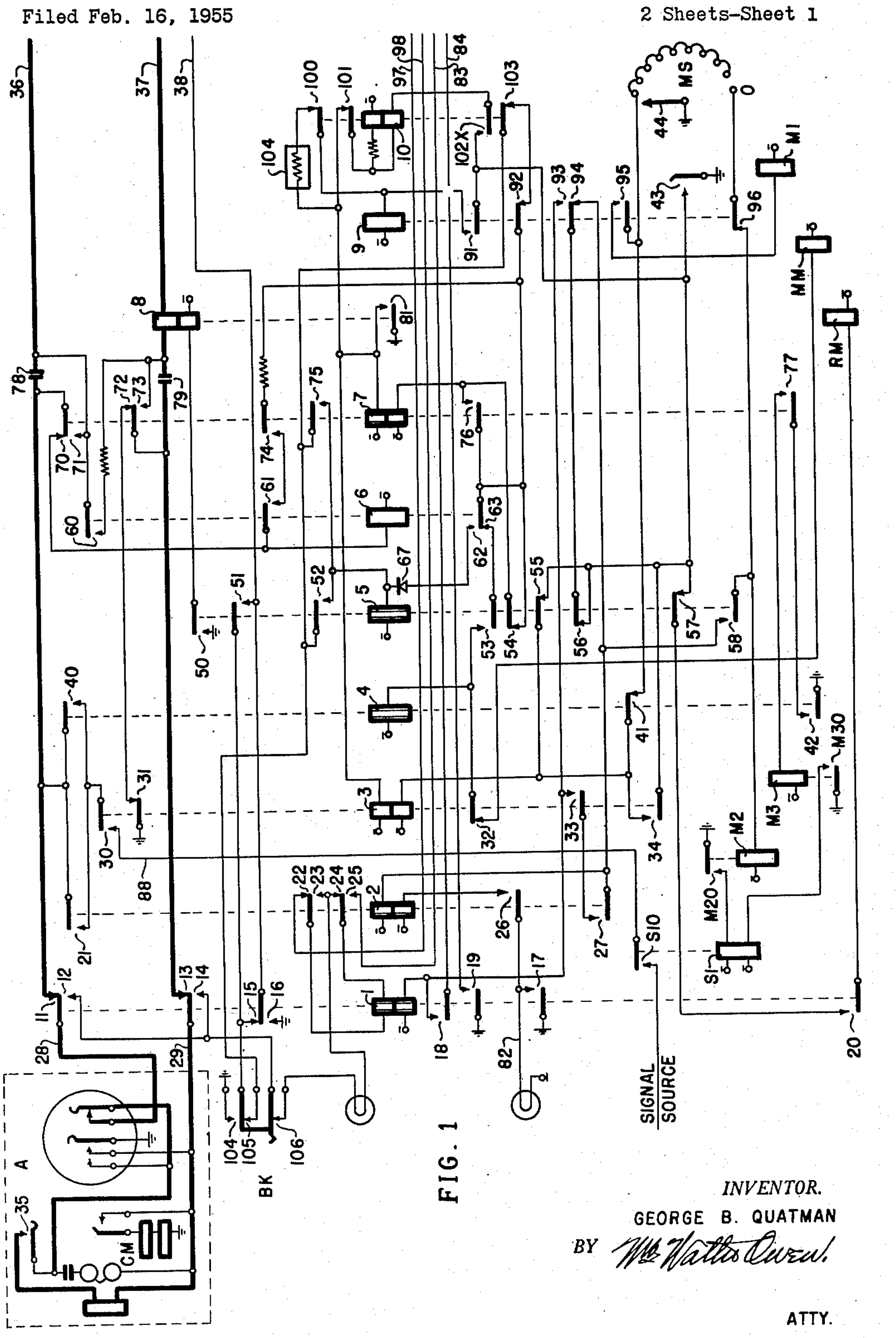
Figure 1 shows a paystation A, a paystation line and associated line equipment.

Referring now to Figure 1, it will first be assumed that a party at station A desires to call local station B. The calling party in picking up the telephone receiver closes hookswitch contacts 35 which complete a path to operate line equipment relay 6 from ground, through break contacts 31 of relay 3, break contacts 72 of relay 7, break contacts 13 of relay 1, line 29, the paystation transmitter, hookswitch contacts 35, dial springs, line 28, break contacts 11 of relay 1, break contacts 70 of relay 7, and through relay 6 to battery. Relay 6 operates and closes its make contacts 60, 61 and 62, thus closing a line loop to relay 500 of Fig. 2 at contacts 60, preparing a locking circuit for itself at contacts 61 and closing a partial operating path to relay 5 at contacts 62.

Relay 500 operates from ground, through contacts 602, 60 and 601, and through relay 500 to battery, closing its make contacts 501, 503 and 504, thus placing ground on lead 38, through contacts 501, grounding linefinder start lead 505 through contacts 504 and placing battery on linefinder control lead 604 through relay 600 and contacts 503. A linefinder begins searching for this line, stopping when it encounters the battery on lead 604, and connecting lines 605 and 606 through to a selector. The selector will place ground and dial tone on line conductor 605, battery on line conductor 606 and ground on lead 604. Relay 600 operates from ground on lead 604, through contacts 503 and the relay to battery, and locks to this ground through contacts 603. Relay 600 operates contacts 601 and 602 releasing relay 500.

The ground holding relay 600 operated is now placed on lead 38 through contacts 603 and 502. This ground marks the line as busy to any incoming calls and causes operation of relay 5 over lead 38, through contacts 15, 105, 103, 92, 62, rectifier 67 and through relay 5 to battery. Relay 5 closes make contacts 50 providing a path from ground through the lower winding of relay 8 which will not operate at this time, since its upper winding is carrying current in the opposite direction, thus acting in opposition to the lower winding.

Hearing dial tone the calling party deposits the necessary coin serving to close the coin mechanism circuit and to place ground on line conductor 28 through the coin mechanism, receiver and hookswitch. This ground is required to keep relay 6 from releasing after each digit dialled as will be shown hereinafter.

The calling party now dials the digits of the called station number thereby producing a series of interruptions in the line loop circuit to relay 6. Responsive to these interruptions in its circuit, relay 6 deenergizes momentarily a corresponding number of times and at each deenergization releases its make contacts 60. Similarly each release of contacts 60 causes an interruption in the loop circuit to the succeeding switches, thus "repeating" the pulses to those switches and causing them to perform their respective functions in connecting the line to the called station.

Relay 5, operated as previously described, closes its contacts and prepares a path to relay 4 and to the rotary switch motor magnet MM at contacts 53. With each deenergization of relay 6, caused by the dial spring interruptions of its circuit, contacts 63 close, connecting ground on lead 38 through contacts 51, 105, 103, 92, 63, 53 and relay 4 to battery causing relay 4 to operate, and through contacts 32 and the motor magnet MM to battery causing MM to operate. Relays 4 and 5 are slow-to-release and remain operated during dialling of the first digit. Operation of the motor magnet causes the minor switch MS to take one step on each energization of the motor magnet MM, closing off normal springs 43 on the first step. At the end of the first digit pulses, relay 6 will remain operated and relay 4 will release, ground being removed from relay 4 at opening of contacts 63. A path is now completed to operate relay 3 from ground, through the minor switch wiper 44, bank contacts, contacts 41, and the lower winding of relay 3 to battery. Relay 3 will lock to ground through contacts 34 and minor switch off-normal springs 43. Contacts 32 will open and prevent further operation of the motor magnet MM. Contacts 31 will open, removing ground from the line loop. A holding ground for operation of relay 6 was placed on the line 28 by deposit of coins as previously shown. Should the calling party fail to deposit coins on a local call, removal of ground at contacts 31 will restore relay 6 after each digit, thus opening the line loop and preventing transmission of pulses to succeeding switches.

When the called party at station B answers the call, the direction of current is reversed in the line loop by the connector, and the upper winding of relay 8 now passes current in a direction which aids the lower winding, thus causing relay 8 to operate. Contacts 81 close, completing a path from ground through the upper winding of relay 7 to battery. Relay 7 operates opening the circuit to relay 6 at contacts 70 and 72 and closing a talking path at contacts 71 and 73. Relay 9 is operated from the same ground through contacts 81, thermistor 104, contacts 100 and through relay 9 to battery. Relay 9 only operates upon completion of a connection to a called party and determines if the coin deposited to operate the paystation is to be collected. It will not operate on "free" calls to an operator, or if a busy condition is encountered, as explained later in connection with these conditions. Relay 3 is also held operated from this ground through its upper winding to battery. Contacts 95 and 34 are closed by operation of relays 9 and 3 respectively, and a circuit is completed to the local call meter from ground through off-normal spring contacts 43, through contacts 34, 41 and 95 and through the metering relay M1 to battery. A record of local calls from the paystation is thus preserved.

When the party at the paystation hangs up, switchhook contacts 35 open the line loop, releasing the succeeding switches which remove ground from lead 38. Relay 5 releases when this ground is removed causing relays 8 and 7 to release in turn. Relay 9 is held operated at this time from a locking ground at the off-normal spring through contacts 43 and 91.

A path is now completed from this ground, through contacts 43, 56 and 93 and through the lower winding of relay 1 to battery. Operation of relay 1 closes contacts 12 and 14 opening the line circuit to the succeeding switch train, and completing a path from an interrupted direct curent 110 volt source over lead 97, through contacts 22, the upper winding of relay 1, contacts 24, a switchboard lamp, contacts 106, contacts 14, along line 29 to the coin mechanism, also through contacts 12 and line 28 to the coin mechanism, and through the coin magnets to ground, whereby the coin magnets operate their armature to collect the coins. Upon collection of the coins, the ground through the coin mechanism is removed. Relay 1 closes contacts 16 to place ground on lead 38 thus busying the line against incoming calls during coin collection. Relay 1 also closes contacts 20 completing a path to the release magnets RM of the minor switch MS from ground at the off-normal springs, through contacts 43, 57, 20 and the release magnets to battery. The minor switch restores, opening contacts 43, and thereby opening the path from ground through the lower winding of relay 1.

Relay 1 is held operated until the coins are collected and the coin mechanism ground removed.

Current through the upper winding holds the relay 1 while the interrupted 110 volt source is connected to it, and during the off periods of the 110 volt source, ground is placed on lead 83 energizing the lower winding of relay 1 through contacts 18.

Figures 1A, 2:
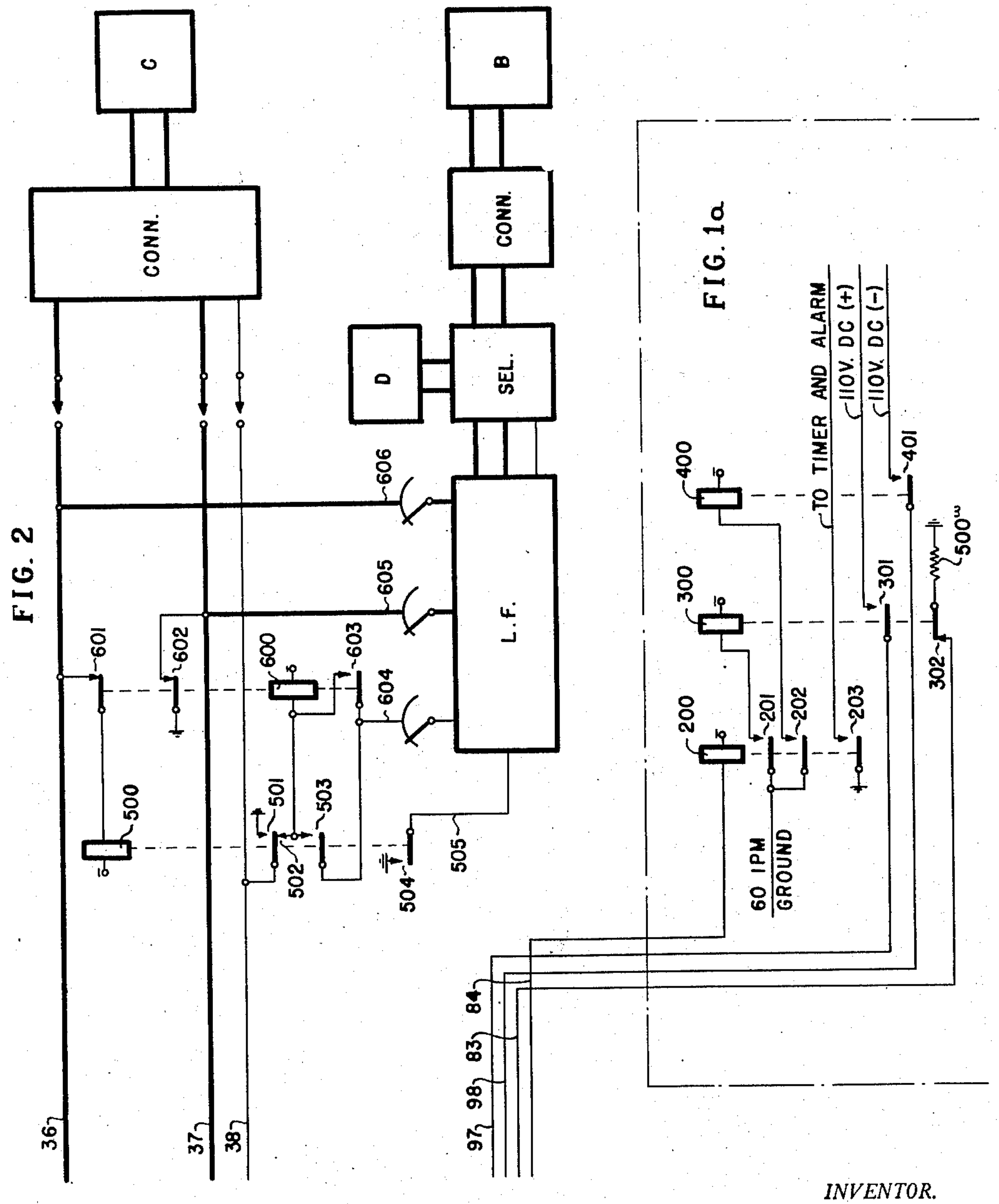
Figure 1A shows sources of paystation signal and coin collect and refund current with connections to the paystation line equipment of Figure 1.
Figure 2 shows regular subscriber stations B and C and a toll operator's position D with circuit connections between these points and the paystation line and cut off relays.

The operation for providing interrupted current to the line equipment for the collect and refund operations is shown in Figure 1A. With operation of relay 1, contacts 19 close, placing ground on lead 84 and completing a path for operation of relay 200 in Figure 1A. Relay 200 closes its contacts 201 and 202, completing a path from interrupted ground to relay 300 through contacts 201 and to relay 400 through contacts 202.

Relays 300 and 400 operate intermittently connecting the 110 volt source intermittently to leads 97 and 98 respectively through contacts 301 and 401. Relay 300 also removes ground from lead 83 by opening contacts 302 each time it connects the 110 volt source to lead 97 at contacts 301.

Relay 200 also closes contacts 203 placing ground on timing and alarm equipment lead which will notify an operator, if relay 1 remains operated for a specified period of time, that there is trouble at the paystation.

If the called party does not answer, relay 8 will not operate. When the paystation hangs up, the circuit of relay 6 will be broken at the hookswitch, and it will release, opening its contacts 62 and thus opening the path from ground to relay 5. Upon release of relay 5, a path is completed from ground through off-normal contacts 43, contacts 56, 94 and the upper winding of relay 2 to battery.

Relay 3 was operated when the first digit was dialled, a path being completed from ground at the minor switch, through the contact of the switch corresponding to the digit dialled, contacts 41, and through the lower winding of relay 3 to battery. Relay 3 locks to ground through contacts 34 and off-normal spring contacts 43.

With relays 2 and 3 operated, a path to relay 1 is completed from ground at the off-normal springs, through contacts 43, 56, 94, 27, 33 and the lower winding of relay 1 to battery causing relay 1 to operate.

A circuit is then completed from negative 110 volt refund current over conductor 98 through contacts 25, upper winding of relay 1, contacts 23, lamp, contacts 106, 14, line 29, and coin magnets to ground. The coin magnets operate their armature in reverse and return the coins to the calling party.

The circuit permits a calling party at the paystation to dial a particular digit to reach a toll operator, without deposite of coins. As shown in the drawing the "free" digit in this case is zero, though any digit may be utilized as desired.

Relays 6 and 5 operate as hereinbefore shown upon closure of hookswitch contacts 35 and seizure of the circuit by a linefinder switch. The calling party now dials the digit "0" without first depositing a coin. Relay 4 operates upon the first deenergization of relay 6, caused by the dial interruptions, and remains operated during the first series of interruptions due to its slow-to-release character. The motor magnet steps the minor switch wipers one step for each dial interruption. Relay 3 is prevented from operating from ground on the minor switch wiper through the bank contacts, since relay 4, being operated, breaks the circuit at contacts 41. The minor switch wiper will reach the tenth contact, corresponding to the digit "0," and will complete a path to relay 2 from ground, through minor switch wiper 44, the tenth bank contact, contacts 96, 58, and through the upper winding of relay 2 to battery. A path from the same ground, through contacts 96 will operate a meter M2, recording toll calls from the paystation. M2 will also operate relay S1 through contacts M20, and S1 will connect the source of paystation signal to lead 88 through contacts S10. The source of paystation signal may be a recorded message signifying that this is a paystation or merely a distinctive tone.

Operation of relay 2 prepares a partial path for 110 volt refund current to the paystation coin magnets at contacts 23 and 25 and closes a partial path from the source of voice or tone signal to the called toll operator at contacts 21.

When the operator answers, reverse battery is received over the line loop, and relay 8 receives current through its upper winding in a direction which assists the lower winding and causes relay 8 to operate. Contacts 81 close and ground paths to relays 3, 7, 9 and 10. Relay 7 is operated from this ground through its upper winding to battery, and its operation shorts out condensers 78 and 79 in the line loop at contacts 71 and 73. It also prevents release of relay 6 by closing contacts 74 prior to opening of contacts 70, thus providing a locking ground for relay 6 from the control lead 38 through contacts 51, 105, 103, 92, 74, 61, through relay 6 to battery. Relay 7 locks to the same ground through contacts 51, 105, 103, 92 and 76. Relay 3 operates from ground, through contacts 81, and through its upper winding to battery and closes its contacts 30 and 33. The paystation voice or tone signal is then transmitted to the toll operator through contacts 30, 21, 71 and out on line 36. A path for operation of relay 1 is completed from ground at the minor switch MS, over wiper 44, through contact 10 of the switch, contacts 96, 58, 27 and 33 and through the upper winding to battery. The coin refund operation, explained hereinbefore, will follow. Since there is normally no coin in the paystation, the operation may be superfluous, but it is necessary in order to return coins inadvertently deposited on calls to the operator.

Relay 10 operates before relay 9 in the above sequence, from ground, through contacts 81 and 101, and 800 ohm resistor and its upper winding to battery. The energy received by relay 10 at this point is only sufficient to operate its contacts 102X. Closure of contacts 102X places ground from off-normal contacts 43 on one side of the lower winding and the operating ground on the other side, thus short circuiting the winding. Current through the upper winding is insufficient to operate relay 10 fully.

Relay 9 operates, after a short delay caused by thermistor 104, over a path from ground through contacts 81, thermistor 104, contacts 100 and through the relay winding to battery. Since relay 10 did not operate fully, its contacts 100 remained closed, and the path to relay 9 is completed upon operation of the thermistor 104. The original path from ground to relays 1 and 2 is opened at break contacts 96 of relay 9, so that when the coins are returned, removing the coin mechanism ground, relays 1 and 2 will release. Release of relay 2 removes the paystation tone from the line at restoration of make contacts 21. Release of relay 1 restores the talking connection at contacts 11 and 13.

The operator now receives the toll call information from the paystation calling party and requests deposit of the necessary toll charge, listening for the characteristic tones, and collecting coins by impressing 110 v. current from the toll board over the talking circuit when the connection to the called party is completed.

Should the operator neglect to collect the coins, this operation will be performed automatically by the line equipment when the call is released. The circuit operation is the same as explained earlier in regard to release of a local call.

On full directory code "free" calls from the paystation, such as "information," "intercept," etc., the operator, on answer, momentarily reverses battery on the line loop through the upper winding of relay 8, releasing relay 8 and reoperating it on reversal to the previous condition. During this momentary release of relay 8, contacts 81 open, removing the short circuit from the lower winding of relay 10 and permitting relay 10 to operate fully. The original ground path is broken by operation of break contacts 101, and a path for operation of relay 9 is broken by operation of break contacts 100. Relay 9 was prevented from operating at the same time relay 10 operated initially, by thermistor 104 which causes a time delay in the operating path of relay 9. Complete operation of relay 10 also operates break contacts 103 opening the locking path for relay 6 and the lower winding of relay 7. When the talking connection is released, ground is removed from lead 38 releasing relay 5. Relays 3 and 10 remain operated from ground at off-normal springs 43, and a path from this ground to relay 2 is now completed through contacts 56 and 94. Relay 2 closes its contacts 27, thereby completing a path from the same ground to the lower winding of relay 1 through contacts 56, 94, 27 and 33. Operation of relay 2, followed by operation of relay 1, causes the coin refund operation to begin as hereinbefore explained.

Relay 10 is operated in the same manner on local calls interrupted busy signal is received. The busy signal will interrupt the circuit of relay 8, providing the momentary release of relay 8 required to operate relay 10 fully and permitting the coin refund operation to be completed when the paystation subscriber hangs up, a path to relay 1 being completed from ground through off-normal contacts 43, contacts 56, 94, 27, 33, and the lower winding of relay 1 to battery.

The calling party at the paystation is prevented from dialling more than one digit effectively without deposit of a coin. Upon dialling a first digit, other than the "free" digit "0," ground at wiper 44 will be connected to a bank contact of minor switch MS, grounding a path to relay 3 which will operate and open its contacts 31 removing ground from the line loop path to relay 6, the pulsing relay. Without ground from the coin mechanism, relay 6 will now release and restore the circuit to normal.

Contacts 32 of relay 3 will also operate opening the path to the motor magnet MM, and thus prevent further stepping of switch MS to the tenth position from subsequent dialling. This precaution is taken to prevent a normal call (appropriate coins deposited) from stepping the minor switch on subsequent dialling to the tenth or "free" contact to cause rejection of deposited coins on answer.

On calls to the paystation, ground from the incoming connector will be placed on lead 38 causing relay 7 to operate over a path from lead 38, through contacts 15, 105, 103, 92, 54 and through the lower winding of relay 7 to battery. Relay 7 closes contacts 75 establishing a path from the ground on lead 38 through contacts 15, 105 and 75 to operate relay 5. Relay 7 also closes contacts 71 and 73, shorting out condensers 78 and 79, closing the line loop to the paystation and opening a partial path to relay 6 to prevent its operation. In addition relay 7 closes contacts 77 preparing a path for ground to incoming call meter M3.

Relay 5 closes contacts 50 to ground the lower winding of relay 8 which will not operate until assisted by the upper winding. With relay 5 operated and relay 6 not operated, a path is established to relay 4 from ground on lead 38, through contacts 51 (now operated), contacts 105, 103, 92, 63 and 53 (now operated). Relay 4 closes contacts 40 preparing a path for paystation signal current, and closes contacts 42 completing the operating path for M3 which registers the call and operates S1 which in turn closes contacts S10 to connect the signalling current source to lead 88. An extension of the path from the ground operating relay 4 will be completed to the motor magnet MM through contacts 32, energizing this magnet and causing it to step minor switch MS off-normal, closing contacts 43. Relays 2 and 3 cannot operate from this ground since their paths are open at operated contacts 55 and 56 of relay 5.

Ringing current is transmitted to the paystation in the usual manner. On answer, the connector is arranged so that current will flow through the line loop energizing the upper winding of relay 8 so as to assist the lower winding and permit operation of relay 8. Contacts 81 close, grounding paths to relays 3, 7 and 9. Operation of relay 3 closes contacts 30 completing a path for a recorded message or the tone signal current which is transmitted to the calling party or operator from the source, through contacts S10, 30, 40, 71 and out on line 36. Relay 3 also opens the path to the motor magnet MM to prevent further stepping of minor switch MS.

After a time interval determined by thermistor 104, relay 9 will operate and lock to the ground at off-normal contacts 43 through contacts 91. Contacts 92 will open breaking the path from ground to relay 4 causing it to release and remove the paystation signal current from the line.

If this is a collect call, the operator after hearing the paystation signal will now ask for deposit of coins, listening for the characteristic tones, and when satisfied that the proper charge has been deposited, connect the calling party to the paystation line.

Relay 9 will close contacts 93 completing a partial path to relay 1 from ground at off-normal contacts 43. Upon release of the talking circuit, ground will be removed from lead 38 releasing relay 5 and battery will be removed from the talking loop releasing in turn relays 8 and 7. Contacts 56 on relay 5 close, completing an operating path for relay 1 from ground at the off-normal springs, through contacts 43, 56 and 93. Relay 1 operates to collect the coins and to place ground on lead 38 through contacts 16, thus preventing seizure of the line on incoming calls during collection. Relay 1 also closes its contacts 20 completing a circuit to the release magnet RM to return the minor switch MS to normal. Upon reaching normal, MS opens contacts 43 removing ground from relays 1, 3, 9 and RM. Relay 1 will remain operated through its upper winding until the coins are collected.

If the paystation is out of order due to coins jammed in the coin mechanism, etc., relay 1 will continue to operate, keeping a switchboard lamp lighted and, setting off an alarm to notify an operator, as shown hereinbefore. The operator may then operate busy key BK which breaks the path through the upper winding of relay 1 by opening contacts 105. Ground will be placed on lead 38 at contacts 104 so that the paystation will test "busy" on incoming calls. Lead 38 is also opened at break contacts 105 preventing use of the paystation.

While the features of this invention have been disclosed with reference to a specific embodiment only, it is understood, of course, that various modifications may be made in the circuit details without departing from the scope of this invention, and it is intended in the appended claims to cover all such modifications as fall within the true spirit and scope of the invention.

What is claimed is:

1. In a telephone system, a paystation, a plurality of other telephone stations certain of which are operators' positions, means for completing a talking connection between said paystation and any one of said other stations, a source of signalling current, means for applying said signalling current to said connection on all incoming calls to said paystation and on outgoing calls to an operator's position for notifying the party at said other station that said other station is connected to a paystation.

2. In a telephone system, a paystation, a plurality of other telephone stations certain of which are operators' positions, means for completing a talking connection between said paystation and any one of said other stations, line equipment individual to the line of said paystation, a source of signalling current, means in said line equipment, effective on all incoming calls to said paystation and on outgoing calls from said paystation to an operator's position, for applying said signalling current to said connection to notify the party at said other station that said other station is connected to a paystation.

3. In a telephone system, a paystation line, a plurality of calling lines, means for extending a talking connection from any one of said calling lines to said paystation line, line equipment individual to said paystation line, a source of signalling current, means in said line equipment for preparing a path from said source of signalling current to said connection, and other means in said line equipment, actuated when said paystation answers, for completing said path for signalling current, to thereby notify the calling party that the called station is a paystation.

4. In a telephone system, a paystation line, a plurality of calling lines, means for extending a talking connection from any one of said calling lines to said paystation line, line equipment individual to said paystation line, a source of signalling current, means in said line equipment effective subsequent to establishment of said talking connection for applying said signalling current to said connection to thereby notify the calling party that the called station is a paystation, and other means in said line equipment, effective after said signalling current has been applied to said talking connection for a short interval of time, for preventing said first mentioned line equipment means from further applying said signalling current to said talking connection.

5. In a telephone system, a calling paystation, an operator's position, means for extending a talking connection from said paystation to said operator's position, line equipment individual to the line of said paystation, a source of signalling current, means in said line equipment for preparing a path from said source of signalling current to said connection, other means in said line equipment, actuated upon answer of the call by the operator, for completing said signalling current path to thereby notify the operator that the calling station is a paystation.

6. In a telephone system, a calling paystation line, a plurality of called lines certain of which are trunk lines to operators' positions, means for extending a talking connection from said paystation line to any one of said called lines, line equipment individual to said paystation line, a switch in said line equipment, a source of signalling current, means in said line equipment actuated by said switch for applying said signalling current to said connection, said switch actuating said line equipment means only when the called line is a trunk line to an operator's position, to thereby notify the called operator that the calling station is a paystation.

7. In a telephone system, a calling paystation, an operator's position, means for extending a connection from said paystation to said operator's position, line equipment individual to the line of said paystation, a source of signalling current, means in said line equipment for preparing a path from said source of signalling current to said connection, a coin mechanism in said paystation, a source of coin return current, said line equipment means also effective for preparing a path from said source of coin return current to said coin mechanism, other means in said line equipment actuated upon completion of said connection for completing said signalling current path and for causing said coin return current path to be completed, to thereby notify the operator that the calling station is a paystation and return coins deposited in said mechanism to the calling party.

8. A telephone system as claimed in claim 6, in which said line equipment means causes said source of signalling current to be disconnected from said connection upon completion of the coin return operation.

9. In a telephone system, a calling paystation line, a plurality of called lines certain of which are trunk lines to operators' positions, means for extending a connection from said paystation line to any one of said called lines, line equipment indvidual to said paystation line, a switch in said line equipment, a source of signalling current, means in said line equipment actuated by said switch for preparing a path from said source of signalling current to said connection, a coin mechanism in said paystation, a source of coin return current, said line equipment means also effective when actuated by said switch for preparing a path from said source of coin return current to said coin mechanism, said switch actuating said line equipment means only when the called line is a trunk line to an operator's position, other means in said line equipment actuated upon completion of said connection, for completing said signalling current path and for causing said coin return current path to be completed, to thereby notify the operator that the calling station is a paystation and return coins deposited in said mechanism to the calling party.

10. A telephone system as claimed in claim 9 in which said line equipment means causes said source of signalling current to be disconnected from said connection upon completion of the coin return operation.

11. In a telephone system, a calling paystation, a plurality of called stations including local subscriber stations, toll operators' positions, and company stations such as information and intercept, means for extending a talking connection from said paystation to any one of said called stations, line equipment individual to the line of said paystation, a source of signalling current, means in said line equipment effective only if an operator's position is called for applying said signalling current to said connection to thereby notify the operator that the calling station is a paystation, a coin mechanism in said paystation, said line equipment means cooperating with other line equipment means to return coins deposited in said mechanism on calls to an operator's position or a company station and to collect coins deposited in said mechanism at the completion of calls to local subscriber stations.

12. In a telephone system, a calling paystation, a plurality of called stations certain of which are operators' positions, means for extending a talking connection from said paystation to any one of said called stations, line equipment indvidual to the line of said paystation, a source of signalling current, means in said line equipment effective only when an operator's position is called to apply said signalling current to said connection, a coin mechanism in said paystation, said line equipment means effective on calls to stations other than operators' positions to prevent the extension of said connection until coins are deposited in said mechanism.

13. A telephone system such as claimed in claim 11 in which said line equipment means cooperates with other means in said line equipment for causing coins deposited in said mechanism to be returned on calls to operators' positions and on incompleted calls, and for collecting said coins on completed calls to stations other than operators' positions.

14. In a telephone system, a paystation, a plurality of other telephone stations certain of which are operators' positions, means for completing a talking connection between said paystation and any one of said other stations, a switch individual to the line of said paystation, a source of signalling current, first, second and third call meters, means for operating said switch, said switch operated by said means on calls to said paystation for causing said current to be applied to said connection and for causing said first meter to register said calls, said switch operated by said means on calls from said paystation to an operator's position for causing said current to be applied to said connection and for causing said second meter to register said calls to operators' positions, said switch operated by said means on calls from said paystation to a telephone station other than said operators' positions for preventing said current from being applied to said connection and for causing said third meter to register said calls to telephone stations other than said operators' positions.

15. In a telephone system, a paystation, a plurality of other telephone stations certain of which are operators' positions, an impulse repeater individual to the line of said paystation, means for establishing a talking connection through said repeater between said paystation and any one of said other stations, a switch associated with said repeater, a source of signalling current, means operating said switch upon initiation of calls to or from said paystation, said switch operated by said means on calls to said paystation and on calls from said paystation to an operator's position for causing said current to be applied to said connection.

References Cited in the file of this patent

UNITED STATES PATENTS

| | | |
|---|---|---|
| 2,367,769 | Goddard | Jan. 23, 1945 |
| 2,672,513 | Lomax | Mar. 16, 1954 |
| 2,700,069 | Pharis et al. | Jan. 18, 1955 |